United States Patent
Shim

(10) Patent No.: US 7,706,951 B2
(45) Date of Patent: Apr. 27, 2010

(54) SHIFT CONTROL SYSTEM OF AUTOMATIC TRANSMISSION AND METHOD THEREOF

(75) Inventor: Hyun Soo Shim, Gwangmyeong (KR)

(73) Assignee: Hyundai Motor Company, Seoul (KR)

( * ) Notice: Subject to any disclaimer, the term of this patent is extended or adjusted under 35 U.S.C. 154(b) by 613 days.

(21) Appl. No.: 11/509,263

(22) Filed: Aug. 24, 2006

(65) Prior Publication Data
US 2007/0142172 A1   Jun. 21, 2007

(30) Foreign Application Priority Data
Dec. 17, 2005   (KR) ................ 10-2005-0124946

(51) Int. Cl.
*G06F 17/00*   (2006.01)
(52) U.S. Cl. .................... 701/56; 475/115; 475/116
(58) Field of Classification Search .............. 701/56; 477/115, 116
See application file for complete search history.

(56) References Cited

U.S. PATENT DOCUMENTS 5,951,615 A * 9/1999 Malson .................. 477/175

\* cited by examiner

*Primary Examiner*—David D Le
*Assistant Examiner*—Derek D Knight
(74) *Attorney, Agent, or Firm*—Morgan, Lewis & Bockius LLP

(57) ABSTRACT

A shift control system of an automatic transmission and a method thereof include controlling the off-going and on-coming clutches according to hydraulic pressures of the off-going and on-coming clutches calculated based on a flare amount when a flare occurs, controlling the on-coming clutch according to hydraulic pressure of the on-coming clutch calculated based on a shifting time interval when the flare does not occur and the shifting time interval is smaller than or equal to a predetermined time interval, and controlling the off-going and on-coming clutches according to hydraulic pressures of the off-going and on-coming clutches calculated based on an excess rate of change of a turbine speed when the shifting time interval is larger than a predetermined time interval.

6 Claims, 2 Drawing Sheets

SHIFT CONTROL SYSTEM OF AUTOMATIC TRANSMISSION AND METHOD THEREOF

CROSS-REFERENCE TO RELATED APPLICATION

This application claims priority to and the benefit of Korean Patent Application No. 10-2005-0124946 filed in the Korean Intellectual Property Office on Dec. 17, 2005, the entire contents of which are incorporated herein by reference.

BACKGROUND OF THE INVENTION (a) Field of the Invention

The present invention relates to a shift control system of an automatic transmission and a method thereof.

More particularly, the present invention relates to a shift control system of an automatic transmission and a method thereof that controls hydraulic pressures of an off-going clutch and an on-coming clutch during shifting.

(b) Description of the Related Art

In an automatic transmission provided with a clutch-to-clutch shift system, which is an independent shift system, when up-shifting or down-shifting a shift speed, an off-going clutch is controlled not by controlling a hydraulic pressure of the off-going clutch, but by controlling a time when the hydraulic pressure of the off-going clutch is released. After controlling the time when the pressure of the off-going clutch is released, the hydraulic pressure is released without additional control.

In such an automatic transmission, the hydraulic pressure of the off-going clutch is determined when a hydraulic pressure of an on-coming clutch rises. However, if the hydraulic pressure of the off-going clutch is quickly released or the hydraulic pressure of the on-coming clutch is slowly applied, flare may occur.

In addition, if the hydraulic pressure of the off-going clutch is high in an up-shifting process, problems such as tie-up and deterioration of ride comfort may occur at the early stages of the shifting process.

The above information disclosed in this Background section is only for enhancement of understanding of the background of the invention and therefore it may contain information that does not form the prior art that is already known in this country to a person of ordinary skill in the art.

SUMMARY OF THE INVENTION

A shift control method of an automatic transmission according to an exemplary embodiment of the present invention includes: detecting a vehicle speed and a throttle opening; determining whether a shifting condition is satisfied based on the vehicle speed and the throttle opening; calculating a required shift speed based on the vehicle speed and the throttle opening from a shifting pattern map table if the shifting condition is satisfied; performing a shifting process based on calculated hydraulic pressures of an off-going clutch and an on-coming clutch that are calculated correspondent to the required shift speed from a hydraulic pressure map table; determining whether a flare occurs in the shifting process; calculating hydraulic pressures of the off-going and on-coming clutches based on the flare amount from the hydraulic pressure map table if flare occurs; and controlling the off-going and on-coming clutches according to the hydraulic pressures thereof calculated based on the flare amount.

In addition, the hydraulic pressures of the off-going and on-coming clutches correspondent to the required shift speed may be updated in the hydraulic pressure map table according to the hydraulic pressures of the off-going and on-coming clutches calculated based on the flare amount.

The shift control method of the automatic transmission may further include: if the flare does not occur, determining whether a shifting time interval is smaller than a predetermined time interval; calculating a hydraulic pressure of the on-coming clutch based on the shifting time interval from the hydraulic pressure map table if the shifting time interval is smaller than or equal to the predetermined time interval; and controlling the on-coming clutch according to the hydraulic pressure thereof calculated based on the shifting time interval.

The hydraulic pressure of the on-coming clutch correspondent to the required shift speed may be updated in the hydraulic pressure map table according to the hydraulic pressure of the on-coming clutch calculated based on the shifting time interval.

The shift control method of the automatic transmission may further include: determining, if the shifting time interval is larger than the predetermined time interval, whether the shifting process has begun; detecting a rate of change of a turbine speed during the shifting time interval if the shifting process has not begun; determining whether the rate of change of the turbine speed is larger than a predetermined value; calculating hydraulic pressures of off-going and on-coming clutches based on an excess rate of change of the turbine speed from the hydraulic pressure map table if the rate of change of the turbine speed is larger than the predetermined value; and controlling the off-going and on-coming clutches according to the hydraulic pressures thereof calculated based on the excess rate of change of the turbine speed.

In addition, the hydraulic pressures of the off-going and on-coming clutches correspondent to the required shift speed may be updated in the hydraulic pressure map table according to the hydraulic pressures of the off-going and on-coming clutches calculated based on the excess rate of change of the turbine speed.

If the shifting process has begun, or the rate of change of the turbine speed is smaller than or equal to the predetermined value, the off-going and on-coming clutches are controlled according to the hydraulic pressures thereof calculated correspondent to the required shift speed.

A shift control system of an automatic transmission according to an exemplary embodiment of the present invention includes: a vehicle speed detector for detecting a vehicle speed and generating a signal corresponding thereto; a throttle opening detector for detecting a throttle opening and generating a signal corresponding thereto; an engine speed detector for detecting an engine speed and generating a signal corresponding thereto; a turbine speed detector for detecting a turbine speed and generating a signal corresponding thereto; a shift control module for calculating hydraulic pressures of an off-going clutch and an on-coming clutch and generating corresponding signals, the shift control module being electrically connected to the vehicle speed detector, the throttle opening detector, the engine speed detector, and the turbine speed detector; and a plurality of solenoid valves for receiving the signals of the shift control module and operating the off-going and on-coming clutches according thereto.

The shift control module may store: a shift pattern map table for calculating a required shift speed based on the vehicle speed and the throttle opening; and a hydraulic pressure map table for calculating the hydraulic pressures of the off-going and on-coming clutches based on the required shift speed, a flare amount, a shifting time interval, and an excess rate of change of a turbine speed.

The shift control module may be programmed to execute a shift control including: detecting a vehicle speed and a throttle opening; determining whether a shifting condition is satisfied based on the vehicle speed and the throttle opening; calculating a required shift speed based on the vehicle speed and the throttle opening from a shifting pattern map table if the shifting condition is satisfied; performing a shifting process according to hydraulic pressures of an off-going clutch and an on-coming clutch that are calculated correspondent to the required shift speed from a hydraulic pressure map table; determining whether a flare occurs in the shifting process; calculating hydraulic pressures of the off-going and on-coming clutches based on the flare amount from the hydraulic pressure map table if flare occurs; and controlling the off-going and on-coming clutches according to the hydraulic pressures thereof calculated based on the flare amount.

In addition, the hydraulic pressures of the off-going and on-coming clutches correspondent to the required shift speed may be updated in the hydraulic pressure map table according to the hydraulic pressures of the off-going and on-coming clutches calculated based on the flare amount.

The shift control may further include: determining, if flare does not occur, whether a shifting time interval is smaller than a predetermined time interval; calculating a hydraulic pressure of the on-coming clutch based on the shifting time interval from the hydraulic pressure map table when the shifting time interval is smaller than or equal to the predetermined time interval; and controlling the on-coming clutch according to the hydraulic pressure thereof calculated based on the shifting time interval.

In addition, the hydraulic pressure of the on-coming clutch correspondent to the required shift speed may be modified in the hydraulic pressure map table according to the hydraulic pressure of the on-coming clutch calculated based on the shifting time interval.

The shift control may further include: determining, if the shifting time interval is larger than the predetermined time interval, whether the shifting process has begun; detecting a rate of change of a turbine speed during the shifting time interval if the shifting process has not begun; determining whether the rate of change of the turbine speed is larger than a predetermined value; calculating hydraulic pressures of off-going and on-coming clutches based on an excess rate of change of the turbine speed from the hydraulic pressure map table when the rate of change of the turbine speed is larger than the predetermined value; and controlling the off-going and on-coming clutches according to the hydraulic pressures thereof calculated based on the excess rate of change of the turbine speed.

In addition, the hydraulic pressures of the off-going and on-coming clutches correspondent to the required shift speed may be updated in the hydraulic pressure map table according to the hydraulic pressures of the off-going and on-coming clutches calculated based on the excess rate of change of the turbine speed.

If the shifting process has begun, or the rate of change of the turbine speed is smaller than or equal to the predetermined value, the off-going and on-coming clutches may be controlled according to the hydraulic pressures thereof calculated correspondent to the required shift speed.

DETAILED DESCRIPTION OF THE PREFERRED EMBODIMENTS

Figure 1:
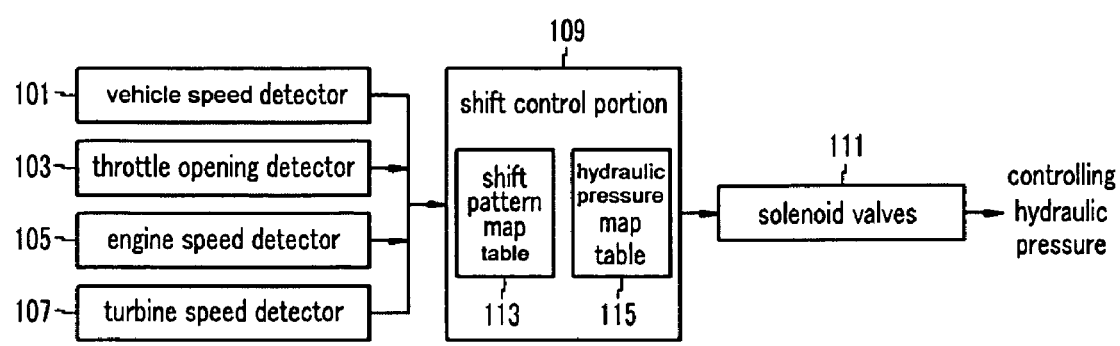
FIG. 1 is a schematic diagram of a shift control system of an automatic transmission according to an exemplary embodiment of the present invention.

Exemplary embodiments of the present invention will hereinafter be described in detail with reference to the accompanying drawings.

A shift control system according to an embodiment of the present invention includes a vehicle speed detector 101 mounted on an output shaft of a transmission so as to detect a rotation speed of the output shaft and to generate a signal corresponding thereto.

The shift control system also includes a throttle opening detector 103, which detects a throttle opening, which corresponds to the amount of depression of the accelerator pedal, and generates a signal corresponding thereto.

The shift control system also includes a engine speed detector 105, which detects an input torque of the transmission according to an angular displacement of a crank shaft and generates a signal corresponding thereto.

The shift control system also includes a turbine speed detector 107, which detects an output torque of the transmission and generates a signal corresponding thereto.

The shift control system also includes a shift control module 109, which may comprise a processor, memory, and associated hardware, software, and/or firmware as bay be selected and programmed by a person of ordinary skill in the art based on the teachings of the present invention. In an exemplary embodiment, shift control module 109 may comprise one or more processors activated by a program that performs the inventive method, which will be described in detail below.

The shift control module 109 stores a shift pattern map table 113 and a hydraulic pressure map table 115. The shift control module 109 is electrically connected to the vehicle speed detector 101, the throttle opening detector 103, the engine speed detector 105, and the turbine speed detector 107, and receives signals of the vehicle speed, the throttle opening, the engine speed, and the turbine speed. In addition, the shift control module 109 calculates hydraulic pressures of an off-going clutch and an on-coming clutch, and generates signals corresponding thereto.

The shift control module 109 respectively receives the signals of the vehicle speed and the throttle opening from the vehicle speed detector 101 and the throttle opening detector 103, and calculates a required shift speed based on the vehicle speed and the throttle opening from the shift pattern map table 113.

The shift control module 109 then calculates the hydraulic pressures of the off-going and on-coming clutches from the hydraulic pressure map table 115 according to the required shift speed calculated from the shift pattern map table 113. The shift control module 109 generates signals of the hydraulic pressures of the off-going and on-coming clutches, and transmits the signals to a plurality of actuators such as solenoid valves 111.

In addition, if a flare occurs, the shift control module 109 calculates hydraulic pressures of the off-going and on-coming clutches from the hydraulic pressure map table 115 based on the flare amount. The shift control module 109 generates corresponding signals and transmits the corresponding signals to the plurality of solenoid valves 111. After that, the hydraulic pressures of the off-going and on-coming clutches correspondent to the required shift speed are updated in the hydraulic pressure map table 115 according to the hydraulic pressures of the off-going and on-coming clutches calculated based on the flare amount in the map table 115.

If flare does not occur, the shift control module 109 detects a shifting time interval, defined as a required time from the time when the shifting condition is satisfied to the time when the shifting process actually begins. The shift control module 109 then determines whether the shifting time interval is smaller than a predetermined time interval. If the shifting time interval is smaller than or equal to the predetermined time interval, the shift control module 109 calculates the hydraulic pressure of the-on-coming clutch from the hydraulic pressure map table 115 based on the shifting time interval and transmits corresponding signals to the plurality of solenoid valves 111. After that, the hydraulic pressure of the on-coming clutch correspondent to the required shift speed is updated in the hydraulic pressure map table 115 according to the hydraulic pressure of the on-coming clutch calculated based on the shifting time interval.

If the shifting time interval is larger than the predetermined time interval, the shift control module 109 detects a rate of change of a turbine speed during the shifting time interval, and compares the rate of change of the turbine speed with a predetermined value.

If the rate of change of the turbine speed is larger than the predetermined value, the shift control module 109 calculates the hydraulic pressures of the off-going and on-coming clutches from the hydraulic pressure map table 115 based on an excess rate of change of the turbine speed, and transmits corresponding signals to the plurality of solenoid valves 111, thus preventing tie-up. After that, the hydraulic pressures of the off-going and on-coming clutches correspondent to the required shift speed are updated in the hydraulic pressure map table 115 according to the hydraulic pressures of the off-going and on-coming clutches calculated based on the excess rate of change of the turbine speed.

The plurality of solenoid valves 111 are mounted on a valve body of the transmission, and actuate the off-going and on-coming clutches by applying the hydraulic pressures thereto or by releasing the hydraulic pressures therefrom. The plurality of solenoid valves 111 are operated according to the signals transmitted from the shift control module 109.

A shift control method of an automatic transmission according to an exemplary embodiment of the present invention will hereinafter be described in detail with reference to the accompanying drawings.

Figure 2:
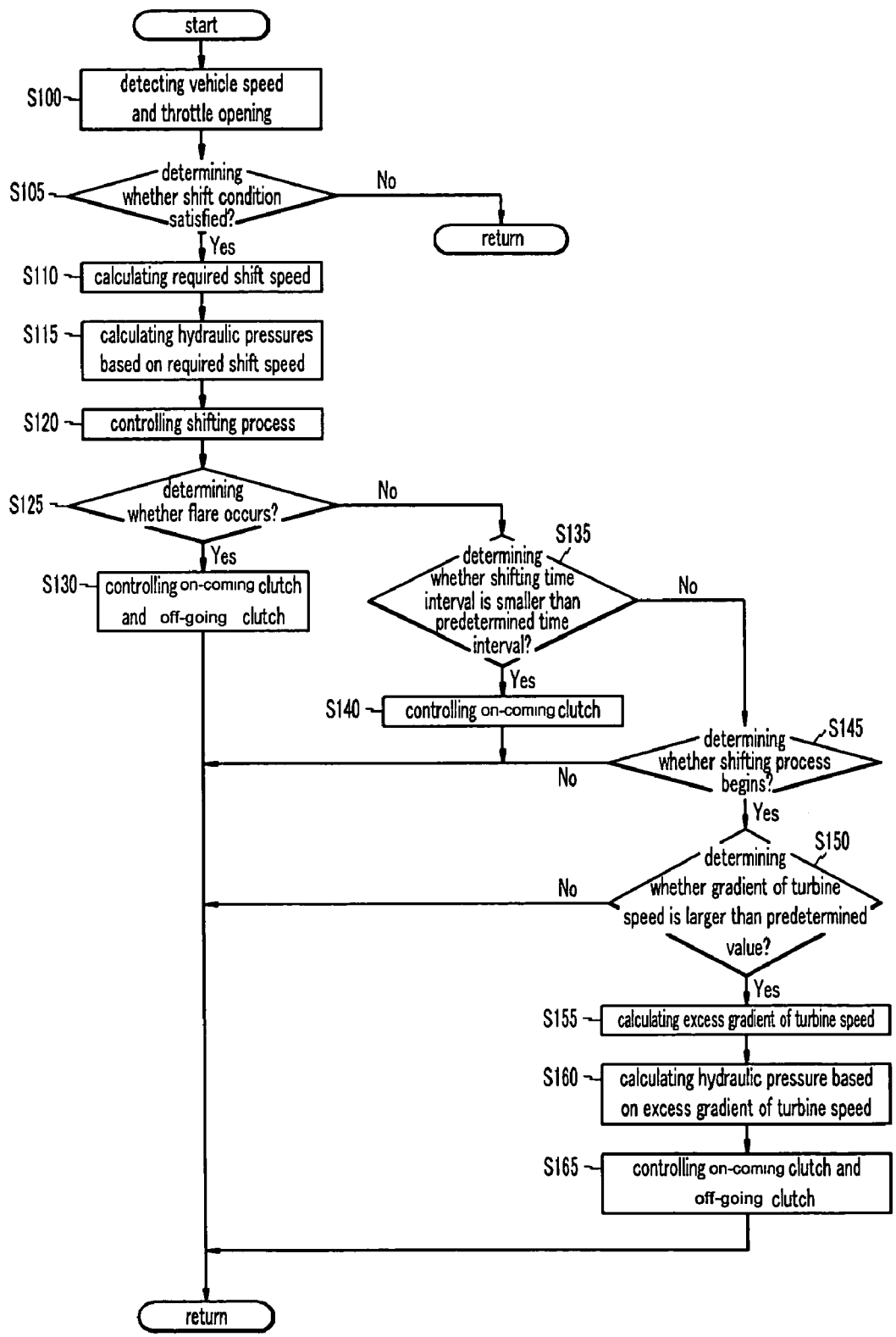
FIG. 2 is a flowchart of a shift control method of an automatic transmission according to an exemplary embodiment of the present invention.

As shown in FIG. 2, when the vehicle is running, the shift control module 109 receives the signal of the vehicle speed from the vehicle speed detector 101 and the signal of the throttle opening from the throttle opening detector 103 at step S100. In this state, the shift control module 109 determines whether the shifting condition is satisfied based on the vehicle speed and the throttle opening at step S105.

If the shifting condition is not satisfied, the current running state is maintained. If the shifting condition is satisfied, the shift control module 109 calculates the required shift speed from the shift pattern map table 113 according to the vehicle speed and the throttle opening at step S110, and calculates the hydraulic pressures of the off-going and on-coming clutches correspondent to the required shift speed at step S115. After that, the shift control module 109 transmits control signals to the plurality of solenoid valves 111, and the plurality of solenoid valves 111 control the shifting process by applying the hydraulic pressures to the off-going and on-coming clutches or by releasing the hydraulic pressures from the off-going and on-coming clutches at step S120.

In this case, the shift control module 109 determines whether flare occurs at step S125. The flare occurs when a hydraulic pressure is quickly released from the off-going clutch or a hydraulic pressure is slowly applied to the on-coming clutch.

If the flare occurs, the hydraulic pressures of the off-going and on-coming clutches are calculated from the hydraulic pressure map table 115 based on the flare amount, and the off-going and on-coming clutches are controlled at step S130 according to the hydraulic pressures thereof calculated based on the flare amount.

In addition, the hydraulic pressures of the off-going and on-coming clutches correspondent to the required shift speed are modified in the hydraulic pressure map table 115 according to the hydraulic pressures of the off-going and on-coming clutches calculated based on the flare amount.

However, if the flare does not occur, the shift control module 109 determines whether the shifting time interval is smaller than the predetermined time interval at step S135.

If the shifting time interval is smaller than or equal to the predetermined time interval, the hydraulic pressure of the on-coming clutch is calculated from the hydraulic pressure map table 115 based on the shifting time interval, and the on-coming clutch is controlled at step S140 according to the hydraulic pressure thereof calculated based on the shifting time interval.

In addition, the hydraulic pressure of the on-coming clutch correspondent to the required shift speed is modified in the hydraulic pressure map table 115 according to the hydraulic pressure of the on-coming clutch calculated based on the shifting time interval.

However, if the shifting time interval is larger than the predetermined time interval, the shift control module 109 determines at step S145 whether the shifting process has actually begun.

If the shifting process has not begun, the off-going and on-coming clutches are controlled according to the hydraulic pressures thereof calculated based on the required shift speed.

If the shifting process has begun, the shift control module 109 receives the signal of the turbine speed from the turbine speed detector 107 and calculates the rate of change of the turbine speed $dN(t)/dt$, where N is the turbine speed in rpm. After that, the shift control module 109 determines at step S150 whether the rate of change of the turbine speed is larger than a predetermined value.

If the rate of change of the turbine speed $dN(t)/dt$ is smaller than or equal to the predetermined value, the off-going and on-coming clutches are controlled according to the hydraulic pressures thereof calculated based on the required shift speed.

If the rate of change of the turbine speed $dN(t)/dt$ is larger than the predetermined value, the excess rate of change of the turbine speed $dN(t)/dt$ is calculated at step S155. The hydraulic pressures of the off-going and on-coming clutches are calculated based on the excess rate of change of the turbine speed $dN(t)/dt$ from the hydraulic pressure map table 115 at step S160. The off-going and on-coming clutches are then controlled according to the hydraulic pressures thereof calculated based on the excess rate of change of the turbine speed at step S165.

In addition, the hydraulic pressures of the off-going and on-coming clutches correspondent to the required shift speed are modified in the hydraulic pressure map table 115 according to the hydraulic pressures of the off-going and on-coming clutches calculated based on the excess rate of change of the turbine speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, the hydraulic pressures of the off-going and on-coming clutches are calculated in an early stage of the shifting process according to the present invention. Thus, the present invention has advantages of minimizing both flare and tie-up, and of enhancing a shift feel.

What is claimed is:

1. A shift control method of an automatic transmission, comprising:
    detecting a vehicle speed and a throttle opening;
    determining whether a shifting condition is satisfied based on the vehicle speed and the throttle opening;
    calculating a required shift speed based on the vehicle speed and the throttle opening from a shifting pattern map table if the shifting condition is satisfied;
    calculating first hydraulic pressures of on-going and an off-coming clutch based on the required shift speed from a hydraulic pressure map table;
    performing a shifting process according to the first hydraulic pressures;
    determining whether a flare occurs during the shifting process;
    calculating a flare amount if a flare occurs;
    calculating second hydraulic pressures of the off-going and on-coming clutches based on the flare amount from the hydraulic pressure map table;
    controlling the off-going and on-coming clutches according to the second hydraulic pressures;
    determining, if the flare does not occur, whether a shifting time interval is smaller than a predetermined time interval;
    calculating a third hydraulic pressure of the on-coming clutch based on the shifting time interval from the hydraulic pressure map table if the shifting time interval is smaller than or equal to the predetermined time interval;
    controlling the on-coming clutch according to the third hydraulic pressure;
    determining, if the shifting time interval is larger than the predetermined time interval, whether the shifting process has begun;
    detecting a rate of change of a turbine speed during the shifting time interval if the shifting process has begun;
    determining whether the rate of change of the turbine speed is larger than a predetermined value;
    calculating fourth hydraulic pressures of off-going and on-coming clutches based on an excess rate of change of the turbine speed from the hydraulic pressure map table if the rate of change of the turbine speed is larger than the predetermined value; and
    controlling the off-going and on-coming clutches according to the fourth hydraulic pressures.

2. The method of claim 1, wherein the first hydraulic pressures are updated in the hydraulic pressure map table according to the second hydraulic pressures.

3. The method of claim 1, wherein the on-coming clutch first hydraulic pressure is updated in the hydraulic pressure map table according to the third hydraulic pressure.

4. The method of claim 1, wherein the first hydraulic pressures are updated in the hydraulic pressure map table according to the fourth hydraulic pressures.

5. The method of claim 1, wherein the off going and on-coming clutches are controlled according to the first hydraulic pressures if the shifting process has begun.

6. The method of claim 1, wherein the off-going and on-coming clutches are controlled according to the first hydraulic pressures if the rate of change of the turbine speed is smaller than or equal to the predetermined value.

* * * * *